(12) United States Patent
Smidt et al.

(10) Patent No.: US 10,608,556 B2
(45) Date of Patent: Mar. 31, 2020

(54) BIDIRECTIONAL POWER CONVERTER

(71) Applicant: HELIOX B.V., Best (NL)

(72) Inventors: Pieter Jan Mark Smidt, Tilburg (NL); Jorge Luiz Duarte, Eindhoven (NL); Franciscus Bernardus Marie Van Horck, Eindhoven (NL)

(73) Assignee: HELIOX B.V., Best (NL)

( * ) Notice: Subject to any disclaimer, the term of this patent is extended or adjusted under 35 U.S.C. 154(b) by 173 days.

(21) Appl. No.: 15/766,356

(22) PCT Filed: Oct. 4, 2016

(86) PCT No.: PCT/EP2016/073688
§ 371 (c)(1),
(2) Date: Apr. 5, 2018

(87) PCT Pub. No.: WO2017/060249
PCT Pub. Date: Apr. 13, 2017

(65) Prior Publication Data
US 2018/0302006 A1    Oct. 18, 2018

(30) Foreign Application Priority Data

Oct. 5, 2015 (EP) .................................. 15188387

(51) Int. Cl.
*H02M 7/797*       (2006.01)
*H02J 7/02*        (2016.01)
(Continued)

(52) U.S. Cl.
CPC ............. *H02M 7/797* (2013.01); *B60L 53/14* (2019.02); *B60L 53/20* (2019.02); *H02J 7/022* (2013.01);
(Continued)

(58) Field of Classification Search
CPC ... Y02T 90/14; Y02T 90/128; Y02T 10/7005; Y02T 10/7088; Y02T 10/705;
(Continued)

(56) References Cited

U.S. PATENT DOCUMENTS

| 2013/0279214 A1* | 10/2013 | Takase | ..................... H02M 7/68 363/37 |
| 2013/0307467 A1* | 11/2013 | Carletti | ............... H02M 1/4225 320/107 |
| 2015/0355259 A1* | 12/2015 | Sartler | .................. G01R 31/028 324/548 |

OTHER PUBLICATIONS

International Search Report and Written Opinion for PCT Patent App. No. PCT/EP2016/073688 (dated Dec. 21, 2016).
(Continued)

*Primary Examiner* — Richard Isla
*Assistant Examiner* — Mohammed J Sharief
(74) *Attorney, Agent, or Firm* — Kenealy Vaidya LLP

(57) ABSTRACT

Some embodiments are directed to a three-phase power converter for converting power between a power grid network and a battery that includes a three-phase grid transformer, a three-phase switching converter for coupling to a positive terminal of the battery, a first, second and third series inductors coupled between the three-phase grid transformer and the three-phase switching converter, a control circuit configured for controlling a first, second and third phase differences between first, second and third time-periodical power grid voltage signals provided by the grid transformer and first, second and third converter time-periodical voltage signals provided to the switching converter such that the first, second and third time-periodical power grid voltage signals and first, second and third converter time-periodical currents are in phase. The three-phase grid transformer provides electrical isolation between the power grid network and the battery.

18 Claims, 6 Drawing Sheets

(51) Int. Cl.
*H02M 1/12* (2006.01)
*B60L 11/18* (2006.01)
*H02M 1/42* (2007.01)
*B60L 53/14* (2019.01)
*B60L 53/20* (2019.01)

(52) U.S. Cl.
CPC ......... *H02M 1/126* (2013.01); *H02M 1/4233* (2013.01); *H02M 1/4208* (2013.01); *Y02B 40/90* (2013.01); *Y02B 70/126* (2013.01)

(58) Field of Classification Search
CPC .... H02M 7/797; H02M 1/126; H02M 1/4233; H02M 1/4208; H02J 7/022; H02J 1/102; H02J 1/08; H02J 7/02; Y02B 40/90; Y02B 70/126; B60L 53/20; B60L 53/14; Y02E 60/12
USPC .................................................. 320/104, 109
See application file for complete search history.

(56) References Cited

OTHER PUBLICATIONS

Zeljkovic, S., et al., "A Three Phase Bidirectional V2G Interface Converter Based on SiC JFETs," 2015 17th European Conference on Power Electronics and Applications (EPE'15 ECCE—Europe), Jointly Owned by EPE Association and IEEE PELS, Sep. 8, 2015, pp. 1-10, XP032800409.

Amin, M. M., et al., "A Three-Phase High Frequency Semi-Controlled Battery Charging Power Converter for Plug-In Hybrid Electric Vehicles," Energy Conversion Congress and Exposition (ECCE), 2011 IEEE, IEEE, Sep. 17, 2011, pp. 2641-2648, XP032067516.

Kesler, M., et al., "Vehicle-to-Grid Reactive Power Operation Using Plug-In Electric Vehicle Bidirectional Offboard Charger," IEEE Transactions on Industrial Electronics, IEEE Service Center, Piscataway, NJ, US, vol. 61, No. 12, Dec. 1, 2014, pp. 6778-6784, XP011558848.

De Sousa, L., et al., "A Combined Multiphase Electric Drive and Fast Battery Charger for Electric Vehicles," Vehicle Power and Propulsion Conference (VPPC), 2010 IEEE, IEEE, Sep. 1, 2010, pp. 1-6, XP031929193.

* cited by examiner

BIDIRECTIONAL POWER CONVERTER

CROSS REFERENCE TO RELATED APPLICATION(S)

This application is a National Phase Filing under 35 C.F.R. § 371 of and claims priority to PCT Patent Application No. PCT/EP2016/073688, filed on Oct. 5, 2016, which claims priority to European Application No. 15188387.3 filed on Oct. 5, 2015, the contents of which are hereby incorporated in their entireties by reference.

BACKGROUND

Some embodiments relate to a three-phase power converter for converting power between a battery and three-phase time-periodical power grid voltage signals, and a power converter system including the power converter or the three-phase power converter.

Recent drive to abate emissions of automotive vehicles has increased the use of electrical vehicles which are driven by electric motors. Electric motors are supplied by batteries which are periodically charged from a charging station or electrical outlet.

Power converters may provide high power to the battery for charging the battery in reasonable short times. Power converters may thus be used to charge the batteries of passenger vehicles or heavy duty commercial vehicles, such as vans, trucks, buses or the like. Power converters may deliver to the battery a power from a few kilowatts to several hundreds of kilowatts depending on the battery capacity and desired charge times.

Existing power converters for charging batteries typically include a chain of transformers and converters whose one end is connected to a voltage source providing a power grid time-periodical voltage and another end is connected to the battery for delivering the desired power to the battery.

One example of such an existing battery charger is described in Whitaker B, et al., "*A High-Density, High-Efficiency, Isolated On-Board Vehicle Battery Charger Utilizing Silicon Carbide Power Devices*", On IEEE Transactions on Power Electronics, VOL. 29, NO. 5, May 2004. Whitaker et al. describes a battery charger consisting of a bridgeless Boost AC-DC Converter and a phase shifted Full-Bridge Isolated DC-DC converter. The bridgeless Boost AC-DC converter converts a power outlet voltage to a direct current voltage (DC) voltage. The phase shifted Full-Bridge Isolated DC-DC converter of Whitaker et al. includes a second converter, implemented by switches for converting the DC voltage again to a time-periodical high-frequency voltage such that a second subsequent transformer can be used for further improving the isolation between the battery and the grid network. The phase shifted Full-Bridge Isolated DC-DC converter of Whitaker et al. further includes a second rectifier, implemented by diodes and a coil, for filtering the high frequency output of the second transformer and providing the desired constant output power for charging the battery.

The first transformer is typically shared between several devices, for example battery chargers as well as household appliances (televisions, refrigerators, personal computers, radios, and the like) wherein each device may require separate isolation. In the existing battery charger the separate isolation can be provided by the second transformer.

SUMMARY

However, since the battery charger described above uses several transformers and converters in the chain connecting the grid network to the battery, the existing battery charger is big and expensive.

A drawback of related art power converters is that they are be big and expensive because a chain of transformers and converters is used to connect a power grid voltage to a battery for charging the battery.

Some embodiments therefore seek to minimize or reduce the size and cost of the existing power converter. Embodiments are defined in the dependent claims.

Some embodiments are directed to a three-phase power converter for converting power between a power grid network and a battery. The power converter includes a three-phase grid transformer, a three-phase switching converter, a first series inductor, a second series inductor, a third series inductor and a control circuit.

The three-phase grid transformer provides electrical isolation between the power grid network and the battery.

The three-phase switching converter includes a first converter terminal for the first phase, a second converter terminal for the second phase and a third converter terminal for the third phase for transferring power between the power grid network and the three-phase switching converter. The three-phase switching converter includes a further converter terminal for electrically connecting to a positive terminal of the battery.

The first series inductor, the second series inductor and the third series inductor are arranged in series between the three-phase grid transformer and the three-phase switching converter.

The first series inductor has a first inductor terminal for electrically coupling to a first grid terminal. The first grid terminal is electrically coupled to a first time-periodical power grid voltage signal for providing a first converter time-periodical current signal. The first series inductor has another first inductor terminal electrically coupled to the first converter terminal for providing a first converter time-periodical voltage signal to the three-phase switching converter.

The second series inductor has a second inductor terminal for electrically coupling to a second grid terminal. The second grid terminal is electrically coupled to a second time-periodical power grid voltage signal for providing a second converter time-periodical current signal. The second series inductor has another second inductor terminal electrically coupled to the second converter terminal for providing a second converter time-periodical voltage signal to the three-phase switching converter.

The third series inductor has a third inductor terminal for electrically coupling to a third grid terminal. The third grid terminal is electrically coupled to a third time-periodical power grid voltage signal for providing a third converter time-periodical current signal. The third series inductor has another third inductor terminal electrically coupled to the third converter terminal for providing a third converter time-periodical voltage signal to the three-phase switching converter.

The control circuit is configured for controlling a first phase difference between the first time periodical power grid voltage and the first converter time periodical voltage signal by switching the switching converter such that the first time-periodical power grid voltage signal and the first converter time-periodical current are in phase.

The control circuit is configured for controlling a second phase difference between the second time periodical power grid voltage and the second converter time periodical voltage signal by switching the switching converter such that the second time-periodical power grid voltage signal and the second converter time-periodical current are in phase.

The control circuit is configured for controlling a third phase difference between the third time periodical power grid voltage and the third converter time periodical voltage signal by switching the switching converter such that the third time-periodical power grid voltage signal and the third converter time-periodical current are in phase.

For example, the control circuit may be electrically coupled to the first inductor terminal and the other first inductor terminal for measuring a first phase difference between the first time-periodical power grid voltage signal and the first converter time-periodical voltage signal.

Similarly, the control circuit may be electrically coupled to the second inductor terminal and the other second inductor terminal and to the third inductor terminal and the other third inductor terminal for measuring a second phase difference between the second time-periodical power grid voltage signal and the second converter time-periodical voltage signal and a third phase difference between the third time-periodical power grid voltage signal and the third converter time-periodical voltage signal, respectively.

By appropriate switching of the three-phase switching converter the control circuit can adjust the first phase difference, second phase difference and third phase difference which are, for example, directly measured by the control circuit across the first series inductor, second series inductor and third series inductor, respectively.

Alternatively, the control circuit may be configured to measure the first, second and third time-periodical power grid voltage signals, the first, second and third converter time-periodical current signals and a voltage at the further converter terminal (i.e. the battery voltage). Based on the measured signals the control circuit may be configured to switch the switching converter such that the first phase difference, the second phase difference and the third phase difference are controlled.

If the first, second and third converter time-periodical current signals are taken positive when flowing from the grid network to the three-phase switching converter, and the first, second and third time-periodical power grid voltage signals are in phase with the respective first, second and third converter time-periodical current signals, then power is converted from the grid network to the battery with minimum power losses. In this case, the three-phase power converter operates in charging mode to charge the battery with a direct current (DC) voltage converted from alternating current (AC) voltages provided by the grid network and grid transformer.

When the control circuit is configured to control the phase of the first, second and third converter time-periodical current signals to be in opposite phase (i.e. the same phase but with opposite sign) with respect to the phase of the respective first, second and third time-periodical power grid voltage signals, the power converter operates in inverter mode converting power from the battery to the grid network (i.e. DC power of the battery to AC power of the grid network) with minimum power losses. Bidirectional power converter may increase stability of the grid by providing power to the grid when possible.

The ratio of real power to reactive power can be adjusted by adjusting the first, second and third phase difference in both charging and inverter modes. In charging mode, the battery can be thereby charged in a controlled way with only two conversion stages and by arranging three inductors in series to the three-phase grid transformer. The power converter is thus simpler and more compact than existing battery chargers. The grid transformer has a primary and a secondary for providing the first, second and third time-periodical power grid voltage signals from a first primary alternating current (AC) voltage signal, a second primary alternating current (AC) voltage signal and a third primary alternating current (AC) voltage signal, respectively. The primary first, second and third time-periodical power grid voltage signals are generated by a power grid source. The power grid source has a reference terminal which is electrically connected to a first reference potential, i.e. the earth. The primary first, second and third time-periodical power grid voltage signals are referenced, in use, to the first reference potential.

The three-phase switching converter, the control circuit, the battery and the secondary of the three-phase grid transformer are referenced, in use, to a second reference potential different from the first reference potential for providing electrical isolation between the battery and the grid network.

The secondary of the grid transformer is electrically coupled to the battery via the first, second and third inductors and switching converter without electrical connection to the first reference potential. The secondary of the grid transformer is referenced, in use, to the second reference potential different from the first reference potential, for example via the first, second and third inductors and the three-phase switching converter.

Electrical isolation between the power grid network and the battery is provided by the three-phase grid transformer.

The second reference potential may be a local ground electrically disconnected from the first reference potential. No direct or indirect electrical connection exists between the primary of the grid transformer, circuitry electrically connected to the primary, and the secondary of the grid transformer and circuitry electrically connected to the secondary.

In some embodiments, the secondary of the grid transformer is not electrically coupled to the battery via an additional transformer. The secondary of the grid transformer is not electrically coupled to the battery via an additional isolation transformer or high frequency transformer.

In one embodiment, the primary of the transformer is arranged in a delta configuration, or also commonly known as Δ configuration and the secondary in a star configuration, or also commonly known as Y configuration. The star configuration has a common connection point, i.e. the star point, which is floating.

In other embodiments, other configurations of the primary and the secondary are possible. The primary may be configured with a star configuration. The secondary may be configured with a delta configuration. Any combinations of delta or star configurations for the primary and secondary are possible. If the primary is configured with a star configuration, the star point of the primary may be electrically connected to the first electrical potential, i.e. to the earth. If the secondary is configured with a star configuration is essential that the star point is floating.

In another embodiment, the three-phase grid transformer is not a standard grid distribution transformer of which only the secondary terminals are accessible to the power converter manufacturer and secondary to primary winding turns ratio cannot be customized. A standard grid transformer is not isolated from the earth. When a standard grid transformer is used and electrical isolation between the power grid network and the battery is desired, an additional isolation transformer, e.g. a high frequency transformer, is used.

The three-phase switching converter may include, for each phase, at least two switches arranged in series between a reference terminal and the positive terminal of the battery. The at least two switches have a common switch terminal electrically connected to the first, second and third converter terminal of the three-phase switching converter. The reference terminal may be connected to the second reference potential, i.e. a local ground.

The control circuit may be configured for switching the switching converter for each phase based on a comparison between a time-periodical carrier signal at a predetermined switching frequency and a time-periodical modulating signal at the grid frequency.

The time-periodical modulating signal may have a modulating amplitude and the time-periodical carrier signal a carrier amplitude. The control circuit may be configured for comparing the modulating amplitude with the carrier amplitude and alternatively switching the at least two switches each time the modulating amplitude becomes higher or lower than the carrier amplitude.

The time-periodical modulating signal may be derived by processing a control signal at the grid frequency and based on the respective phase difference between the time-periodical power grid voltage signal and the converter time-periodical voltage signal, for example measured across the first series inductor. The carrier signal may be generated by a clock generator and defines the frequency of switching the switching converter.

In this way a pulse-width modulated control voltage signal may be obtained to switch on and off the at least two switches such that the phase of the converter time-periodical voltage signal with respect to the phase of the time-periodical power grid voltage signal is controlled to a desired value to transfer a desired amount of power in the desired direction. The grid transformer is arranged to have a selected secondary to primary winding turns ratio, for each phase. The selected secondary to primary winding turns ratio for the first phase defines the ratio between a first amplitude of the first primary time-periodical power grid voltage signal to a second amplitude of the first time-periodical power grid voltage signal. Similarly the selected secondary to primary winding turns ratio for the second and third phases define the ratio between a first amplitude of the second and third primary time-periodical power grid voltage signals to a second amplitude of the second and third time-periodical power grid voltage signals, respectively.

The grid transformer may be a customized hardware component and integrated by the power converter manufacturer in the power converter design. The grid transformer provides electrical isolation between the grid network and the battery. No further transformers are required as in related art power converters. This simplifies the design of the power converter and reduces the costs of manufacturing it.

The distribution grid transformer together with the first, second and third series inductors can be effectively seen as a load of an Alternating Current (AC) induction electric motor. When charging the batter, the functionality of the inventive three-phase power converter can be compared to that of a three-phase AC induction electric motor working in regenerative mode.

By selecting the primary to secondary winding turns ratio of the three-phase grid transformer, the magnitude of the first, second and third converter time-periodical voltage signals and as a consequence the magnitude of the power transferred between the power grid network and the battery can be better controlled.

A first reactance of the first series inductor, a second reactance of the second series inductor and a third reactance of the third series inductor may be selected based on the selected winding turns ratio at a desired power.

The first, second and third reactance reactance may be selected such that the winding turns ratio is equivalent to the ratio of the root mean square of the transferred desired power multiplied by the selected reactance and divided by three, to the first, second and third primary time-periodical power grid voltage signals, respectively.

In an embodiment, the control circuit may be configured to control the first, second and third phase differences between the first, second and third converter time-periodical voltage signals and the first, second and third time-periodical power grid voltage signals to a value close to 45 degrees.

By controlling the first, second and third phase differences, and by properly selecting the first, second and third reactance of the first, second and third series inductors and the winding turns ratio of the grid transformer, power losses due to reactive power circulation in the power converter may be minimized.

In an embodiment an LC filter having a series inductor and a shunt capacitor may be arranged in series for each phase between a respective first, second and third grid terminal of the grid transformer and a first, second and third terminal of the respective first, second and third series inductor. The LC filter may be used to filter harmonic components generated by switching of the switching converter.

A dedicated LC filter may relax the filtering requirements of the first, second and third series inductor, thereby allowing using a smaller first, second and third series inductor. The smaller first, second and third series inductors may be thus optimized only for power transfer between the grid network and the switching converter and reactive power reduction.

In one embodiment, a power converter system is provided. The power converter system may include the three-phase grid transformer. The power converter system may further include a three-phase power converter, a charger connector electrically coupled to a power converter output of the switching converter and mechanically connectable to a vehicle connector. The vehicle connector is electrically coupled to terminals of the battery of the vehicle such that when the charger connector is in electrical contact with the vehicle connector, the converter output is coupled to the battery for charging the battery from the grid network or transferring power from the battery to the grid network.

BRIEF DESCRIPTION OF THE DRAWINGS

These and other aspects of some embodiments are apparent from and will be elucidated with reference to the embodiments described hereinafter. In the drawings, FIG. 1 schematically shows a related art example of a power converter.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

Figure 1:
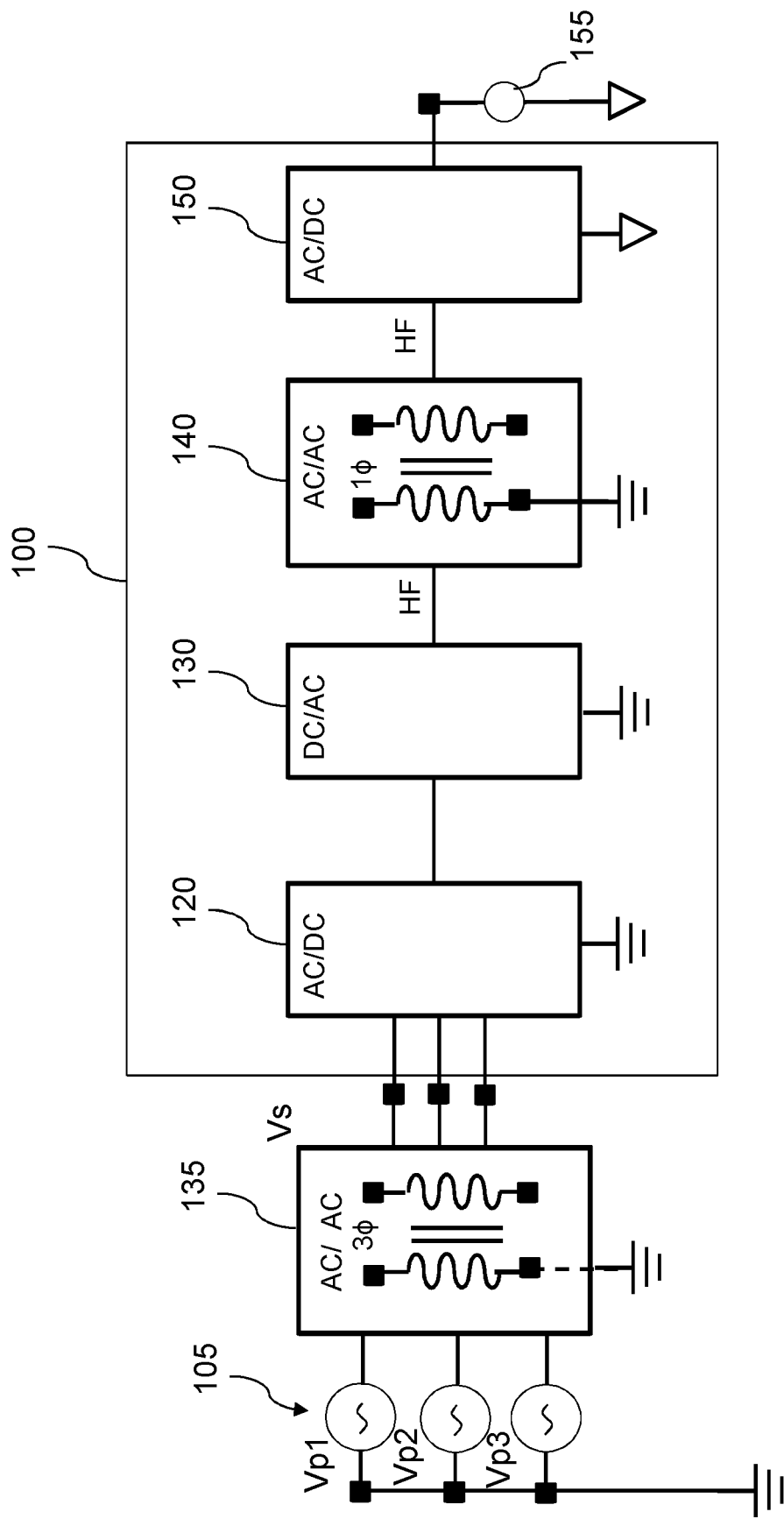

FIG. 1 schematically shows a related art example of a battery charger 100 similar to the one described by Whitaker et al.

The battery charger 100 includes a chain of a first converter 120, a second converter 130, a second transformer 140, and a third converter 150. The battery charger 100 is connected at one end to output terminals of a standard three-phase power grid transformer 135 and at another end to a positive terminal of a battery 155 for charging the battery 155.

The standard three-phase power grid transformer 135 has a primary electrically coupled to a grid voltage source 105 and a secondary for feeding the battery charger 100. First converter 120, second converter 130 and primary of the second transformer 140 are referenced to the earth potential. Since the turn ratio of the grid transformer is a standard one, transfer of the electric power provided by the grid network to the battery 155 is achieved via a chain of many stages of conversion. The secondary of the standard grid transformer 135 may generate three-phase time-periodical power grid voltage signals, i.e. alternating current (ac) voltage signals. For example, the three-phase voltage signals may have peak-to peak amplitudes in the order of a few kilovolts, for example 10 kV. The three-phase voltage signals may periodically vary with a frequency of 50 or 60 Hz. The three-phase voltages may periodically vary with the same oscillation frequency and be shifted in phase between each other, for example 120 degrees from each other. The three-phase voltages may be sinusoidal in shape. The first converter 120 may be an alternating current (ac) to direct current (dc) voltage converter. The output DC voltage of the first converter 120 may be in the order of a few hundreds of volts, for example between 500 to 700 Volts.

The second converter 130 may be a DC to AC converter for outputting a single phase high frequency ac voltage signal of higher frequency than the original power grid voltage signal. For example, the frequency of the output voltage signal of the second converter 130 may be in the order of 20 to 120 kHz (kilohertz).

The second transformer 140 provides high frequency AC/AC transformation of the ac voltage signal applied at its input such that a selected signal isolation between the power grid network and the battery 155 can be obtained.

The third converter 150 provides a DC output voltage and a DC output current for charging the battery 155 from the high frequency (HF) ac voltage output of the second transformer 140. The third converter 150 may provide filtering of the DC output voltage and DC output current such that the DC output voltage and DC output current are maintained substantially constant over time.

However, the related art battery charger 100 includes several devices in the chain which increase costs and size of the battery charger 100.

Figure 2:
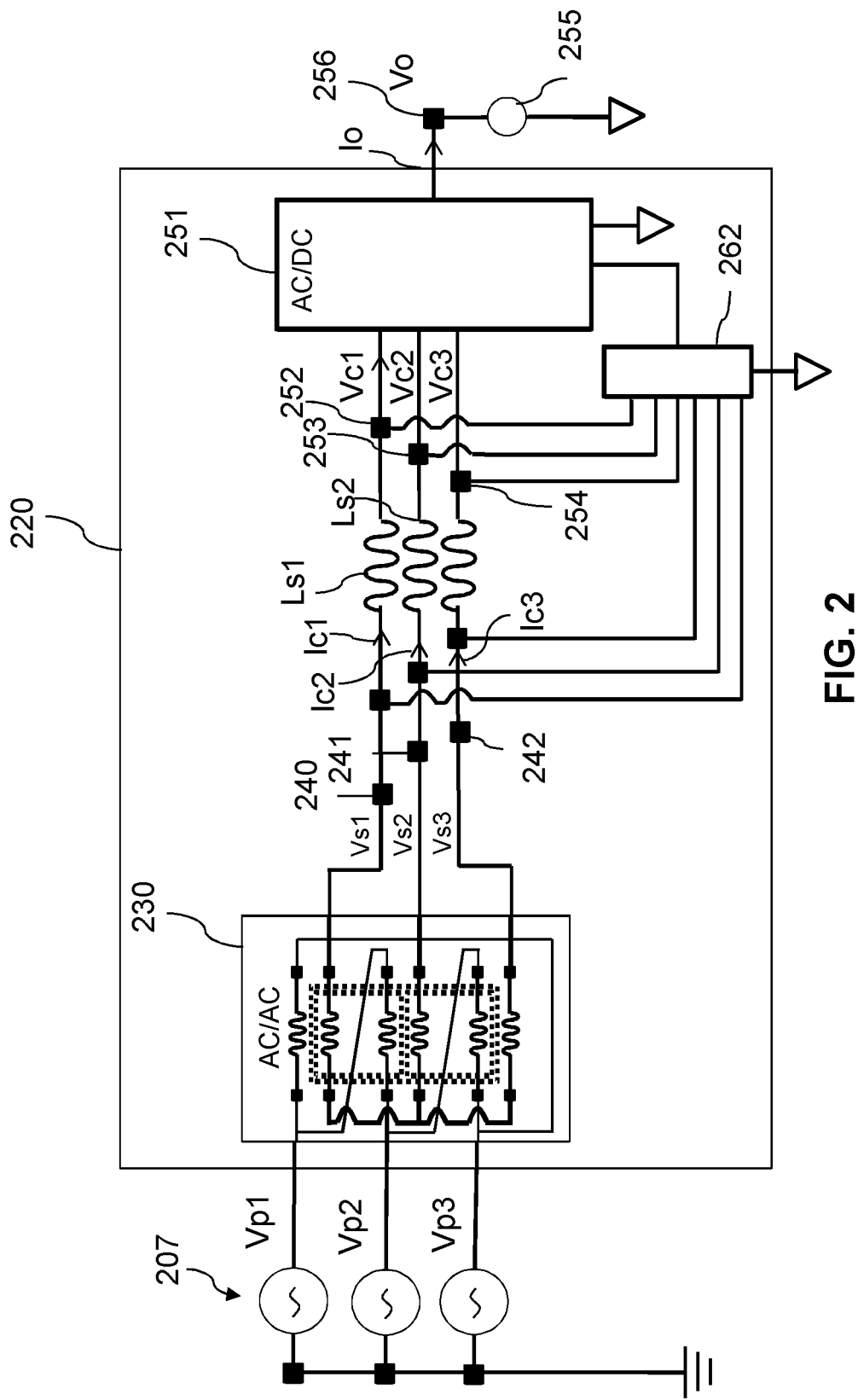
FIG. 2 schematically shows a circuit diagram of a first example of a three-phase power converter according to some embodiments, FIG. 3 schematically shows a circuit diagram of a first example of a single-phase power converter according to some embodiments, FIG. 4 schematically shows the switching control voltages versus time for the circuit of FIG. 3, FIG. 5 schematically shows a phasor diagram of the voltages and currents for the example shown in FIG. 2 or FIG. 3, FIG. 6 schematically shows an optimized phasor diagram of the voltages and currents for the example shown in FIG. 2 or FIG. 3, FIG. 7 schematically shows a circuit diagram of a second example of a three-phase power converter according to some embodiments, FIG. 8 schematically shows an example of a power converter system according to some embodiments.

FIG. 2 schematically shows a first example of a three-phase power converter 220 according to some embodiments.

The three-phase power converter 220 is arranged to convert power between a power grid network and a battery 255. A first time-periodical voltage signal Vs1, a second time-periodical voltage signal Vs2 and a third time-periodical voltage signal Vs3 may be provided by a three-phase grid transformer 230 at a secondary side of the grid transformer 230. The power converter 220 includes the three-phase grid transformer 230. The three-phase grid transformer 230 provides electrical isolation between the power grid network and the battery 255. A primary side of the grid transformer 230 can be connected to a power grid voltage source 207 for generating a first time-periodical power grid voltage Vp1, a second time-periodical power grid voltage Vp2 and a third time-periodical power grid voltage Vp3 at the primary of the grid transformer 230.

The first time-periodical power grid voltage Vp1, the second time-periodical power grid voltage Vp2 and third time-periodical power grid voltage Vp3 may be ac voltage signals having an oscillation frequency of 50 or 60 Hz and amplitude of for example 10 kV root mean square (RMS).

The grid transformer 230 is a power grid distribution transformer having a first primary terminal, a second primary terminal and a third primary terminal connected to the power grid voltage source 207 and a first secondary terminal, a second secondary terminal and a third secondary terminal electrically coupled to the battery 255 via further circuitry of the power converter 220. The secondary terminals may be for example a high power outlet. The first time-periodical voltage signal Vs1, the second time-periodical voltage signal Vs2 and the third time-periodical voltage signal Vs3 may have a peak-to-peak amplitude lower than the first time-periodical power grid voltage Vp1, second time-periodical power grid voltage Vp2 and third time-periodical grid voltage Vp3, respectively. The voltages Vs1, Vs2 and Vs3 may periodically vary with the same oscillation frequency and be shifted in phase between each other, for example 120 degrees from each other. The three-phase voltages Vs1, Vs2 and Vs3 may be sinusoidal in shape.

For example, if the sinusoidal voltage signal at the primary terminal has an amplitude of 10 kV, root mean square (RMS) value, the voltage signal may be scaled down by the grid transformer 230 to a voltage with a amplitude lower than 10 kV RMS, for example 400 V RMS or lower. The three-phase grid transformer 230 includes a pair of wire windings for each phase such that the amplitude of the voltage signal at the primary terminal is scaled down at the secondary terminal proportionally to a ratio between the wire winding turns of the pair.

The three-phase power converter 220 includes a three-phase switching converter 251 electrically coupled to the three-phase grid transformer 230 for transferring power between the grid network and the battery 255. The power transferred by the three-phase switching converter 251 is indicated with an output voltage Vo and output current Io transferred to the battery 255.

The switching converter 251 has a first converter terminal 252 for the first phase, a second converter terminal 253 for the second phase and a third converter terminal 254 for the third phase for transferring power between the power grid network and the switching converter 251, and a further converter terminal 256 for electrically connecting to the positive terminal of the battery 255.

The three-phase power converter 220 further includes a control circuit 262 for switching the switching converter 251 and a first series inductor Ls1, a second series inductor Ls2, and a third series inductor Ls3 arranged in series between the grid transformer 230 and the switching converter 251 for electrically coupling the grid transformer 230 and the switching converter 251.

The first series inductor Ls1 has a first inductor terminal for electrically coupling to a first grid terminal 240. The first grid terminal 240 is electrically coupled to the first time-periodical power grid voltage signal Vs1 for providing a first converter time-periodical current signal Ic1. The first series inductor Ls1 has a another first inductor terminal electrically coupled to the first converter terminal 252 of the switching converter 251 for providing a first converter time-periodical voltage signal Vc1 to the switching converter 251.

The second series inductor Ls2 has a second inductor terminal for electrically coupling to a second grid terminal 241. The second grid terminal 241 is electrically coupled to the second time-periodical power grid voltage signal Vs2 for providing a second converter time-periodical current signal Ic2. The second series inductor Ls2 has a another second inductor terminal electrically coupled to the second converter terminal 253 for providing a second converter time-periodical voltage signal Vc2 to the switching converter 251.

The third series inductor Ls3 has a third inductor terminal for electrically coupling to a third grid terminal 242. The third grid terminal 242 is electrically coupled to the third time-periodical power grid voltage signal Vs3 for providing a third converter time-periodical current signal Ic3. The third series inductor Ls3 has a another third inductor terminal coupled to the third converter terminal 254 for providing a third converter time-periodical voltage signal Vc3 to the switching converter 251.

The control circuit 262 is configured to control a first phase difference between the first time-periodical power grid voltage signal Vs1 and the first converter time-periodical voltage signal Vc1 by switching the switching converter 251 such that a phase of the first time-periodical power grid voltage signal Vs1 with respect to a phase of the first converter time-periodical current signal Ic1 is controlled for reducing power losses when power is converted.

The control circuit 262 may be configured to control the first phase difference between the first time-periodical power grid voltage signal Vs1 and the converter time-periodical voltage signal Vc1 such that a desired power can be transferred.

The control circuit 262 is configured for controlling a second phase difference by switching the switching converter 251 such that the phase of the second time-periodical power grid voltage signal Vs2 with respect to the phase of the second converter time-periodical current signal Ic2 is controlled for reducing power losses for the second phase.

The control circuit 262 is further configured for controlling the third phase difference by switching the switching converter 251 such that the phase of third time-periodical power grid voltage signal Vs3 with respect to the phase of the third converter time-periodical current signal Ic3 is controlled for reducing the power losses of the third phase conversion.

The control circuit 262 may control the first phase difference, second phase difference and third phase difference in any manner suitable for the specific implementation.

For example, as shown in FIG. 2, the control circuit 262 may be electrically coupled to the first inductor terminal and the other first inductor terminal to measure a first phase difference between the first time-periodical power grid voltage signal Vs1 and the first converter time-periodical voltage signal Vc1.

The control circuit 262 may be electrically coupled to the second inductor terminal and the other second inductor terminal for measuring a second phase difference between the second time-periodical power grid voltage signal Vs2 and the second converter time-periodical voltage signal Vc2.

The control circuit 262 may be electrically coupled to the third inductor terminal and the other third inductor terminal for measuring a third phase difference between the third time-periodical power grid voltage signal Vs3 and the third converter time-periodical voltage signal Vc3.

The control circuit 262 may directly measure the first phase difference, second phase difference and third phase difference. Alternatively, the control circuit 262 may measure the first time-periodical power grid voltage signal Vs1, the first converter time-periodical current signal Ic1 and a battery voltage Vo at the further converter terminal 256. Phase and magnitude of the first converter time-periodical voltage signal Vc1, the second converter time-periodical voltage signal Vc2 and third converter time-periodical voltage signal Vc3 may be controlled by switching the switching converter for adjusting the phase of the first converter time-periodical current Ic1 with respect to the phase of the first time-periodical power grid voltage signal Vs1, the phase of the second converter time-periodical current Ic2 with respect to the phase of the second time-periodical power grid voltage signal Vs2, and the phase of the third converter time-periodical current Ic3 with respect to the phase of the third time-periodical power grid voltage signal Vs3 for reducing the power losses when power is converted.

By controlling the first phase difference, second phase difference and third phase difference via the first series inductors Ls1, second series inductor Ls2 and third series inductor Ls3, respectively, and switching the switching converter 251, the battery 255 can be charged in a controlled way with only two conversion stages. The power converter 220 is thus simpler and more compact than known battery charger 100.

To explain further, the power converter 220 can operate in two different modes: in charging mode when power is converted from the grid network to the battery or in inverter mode when power is transferred from the battery to the grid network.

Referring to the first phase, if the first converter time-periodical current signal Ic1 is taken positive when flowing from the grid network to the switching converter (as shown in FIG. 2) and the first time-periodical power grid voltage signal Vs1 is in phase with the first converter time-periodical current signal Ic1, then power is converted from the grid network to the battery 255 with minimum power conversion losses.

When the first time-periodical power grid voltage signal Vs1 has opposite phase (i.e. the same phase but with opposite sign) with respect to the first converter time-periodical current signal Ic1, the power converter 220 operates in inverter mode converting power from the battery 255 to the grid network with minimum power conversion losses.

In charging mode the power converter 220 can be compared to a three-phase ac electric motor functioning, when charging the battery 255, in regenerative mode, i.e. when the motor is for example breaking. The switching converter 251 can be of the same type of converters used to drive ac electric motors. The first series inductor Ls1 can be compared to the winding of the electric motor, i.e. the inductive load of the electric motor.

The applicant has realized that the distribution grid transformer 230 can be effectively seen as an inductive load of an induction electric motor by inserting series inductors Ls1, Ls2 and Ls3 at the secondary side of the grid transformer 230 between the grid transformer 230 and the switching converter 251. In an induction electric motor the electromotive force is the voltage induced in the rotating windings which are turning inside a magnetic field generated inside the induction electric motor. This electromotive force acts against the applied ac voltage that causes the motor to spin and reduces current flowing through the windings. In the power converter 220 the electromotive force can be compared to the first, second and third time-periodical power grid voltage signals Vs1, Vs2 and Vs3 provided by the grid transformer 230.

In this way a compact power converter can be realized directly from a customized grid distribution transformer which provides the desired signal isolation between the power grid network and the battery 255 without additional components.

The grid transformer 230 is used for transforming the first, second and third time-periodical power grid voltage signals Vp1, Vp2 and Vp3 at the primary side to first, second and third time-periodical voltage signals Vs1, Vs2 and Vs3 at the secondary side, respectively. The first, second and third time-periodical power grid voltage signals Vs1, Vs2 and Vs3 may have an amplitude lower than the first, second and third time-periodical power grid voltage signals Vp1, Vp2 and Vp3, respectively. The winding turns ratio of the grid transformer 230 defines the amplitude ratio of the primary power grid voltage signals Vp1, Vp2 and Vp3 to the secondary power grid voltage signals Vs1, Vs2 and Vs3. The grid transformer 230 is arranged to have a selected secondary to primary winding turns ratio such that the phase of the first, second and third time-periodical power grid voltage signals Vs1, Vs2 and Vs3 with respect to the phase of the first, second and third converter time-periodical current signals Ic1, Ic2, and Ic3 can be controlled and, if desired for minimum power losses, be close to zero. By tuning the winding turns ratio of the grid transformer 230, the converter time-periodical ac voltages Vc1, Vc2 and Vc3 and the converter time-periodical ac currents Ic1, Ic2 and Ic3 and as a consequence the power transferred between the grid network and the battery can be better controlled.

The grid transformer 230 may be integrated in the three-phase power converter 220. The applicant has advantageously chosen to embed in the design of the power converter, the grid transformer 230. The grid transformer 230 may be an external hardware component. The power converter manufacturer may directly use the first time-periodical power grid voltage signal Vs1 which may be supplied by the electricity provider via the grid transformer 230. By incorporating the grid transformer 230 in the design of the power converter 220, the charger manufacturer may advantageously use a customized hardware component as integral part of the power converter.

The grid transformer 230 provides electrical isolation between the grid network and the battery 255. The primary of the grid transformer 230 is electrically isolated from the secondary of the grid transformer 230 for providing the desired isolation between the grid network and the battery 255. The power grid voltage source 207 which is electrically connected to the primary of the grid transformer 230 has one terminal electrically connected to a first reference potential, e.g. the earth. The primary first time-periodical power grid voltage signal Vp1, the primary second time-periodical power grid voltage signal Vp2 and the primary third time-periodical power grid voltage signal Vp3 are referenced to the first reference potential. The secondary of the grid transformer 230 is electrically coupled to the battery 255 via inductors Ls1, Ls2 and Ls3 and switching converter 251 without electrical connection to the first reference potential. The secondary of the grid transformer 230 is referenced, in use, to a second reference potential different from the first reference potential, for example via inductors Ls1, Ls2 and Ls3 and switching converter 251. The three-phase switching converter 251, the control circuit 262, and the battery 255 have reference terminals electrically connected to the second reference potential. The three-phase switching converter 251, the control circuit 262, and the battery 255 are thus referenced to the second reference potential. The second reference potential may be a local ground electrically disconnected from the first reference potential. No electrical connection exists between the primary of the grid transformer 230, circuitry electrically connected to the primary, and the secondary of the grid transformer 230 and circuitry electrically connected to the secondary. No direct or indirect electrical connection exists between the primary of the grid transformer 230, circuitry electrically connected to the primary, and the secondary of the grid transformer 230 and circuitry electrically connected to the secondary, even via for example the first reference potential or second reference potential.

In some embodiments the secondary of the grid transformer 230 is not electrically coupled to the battery 255 via an additional transformer. Differently from the related art, the secondary of the grid transformer 230 is not electrically coupled to the battery 255 via an additional isolation transformer or high frequency transformer. No further transformers are required as in the related art power converter 100 described with reference to FIG. 1. This simplifies the design of the power converter and reduces the costs of manufacturing it. In the embodiment as shown in FIG. 2, the primary of the transformer 230 is arranged in a delta configuration, or also commonly known as Δ configuration and the secondary in a star configuration, or also commonly known as Y configuration. The star configuration has a common connection point, i.e. the star point, which is floating.

In other embodiments, not shown in the figures, other configurations of the primary and the secondary are possible. The primary may be configured with a star configuration. The secondary may be configured with a delta configuration. Any combinations of delta or star configurations for the primary and secondary are possible. If the primary is configured with a star configuration, the star point of the primary may be electrically connected to the first electrical potential, i.e. to the earth. If the secondary is configured with a star configuration is essential that the star point is floating.

In another embodiment, the three-phase grid transformer is not a standard grid distribution transformer of which only the secondary terminals are accessible to the power converter manufacturer and secondary to primary winding turns ratio cannot be customized. A standard grid transformer does not provide electrical isolation for a power converter. In known battery charger 100 of FIG. 1, electrical isolation between power grid network and the battery 155 is provided by second high frequency transformer 140.

A standard distribution grid transformer commonly serves a multitude of users' appliances, equipment. One of the users may provide either that the secondary of the standard distribution grid transformer has the star point (the neutral connection of the secondary) connected to the earth, or a direct electrical connection from the secondary to the earth so that if electrical isolation between the appliances, equipment and the grid network is present, this is lost. The three-phase power converter according to some embodiments cannot use a standard distribution grid transformer because electrical isolation between the battery and the grid network cannot be obtained by using a standard distribution grid transformer. In known battery charger 100 of FIG. 1, current between secondary and primary of transformer 135 would still circulate via the reference potential.

The three-phase power converter 220 has the advantages of a three-phase system, for example can be used for transferring higher power levels and provide more stable dc power than single-phase system.

The switching converter 251 and the control circuit 262 may be implemented in any manner suitable for the specific implementation.

Figure 3:
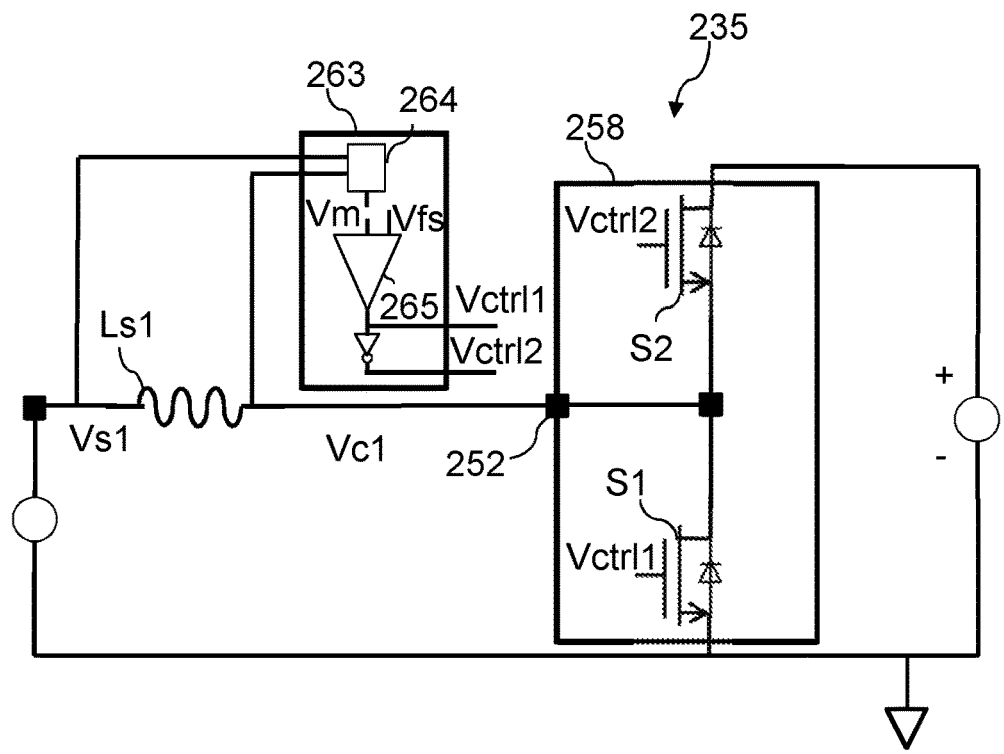

For example FIG. 3 schematically shows a first example of a single-phase power converter 235 according to some embodiments in which exemplary implementations of a switching converter 258 and a control circuit 263 are shown in details. The single-phase power converter 235 may be used for the first phase of a three-phase power converter. Equivalent circuits and concepts applicable to the single-phase power converter 235 may be used for the second phase and third phase of a three-phase power converter.

The switching converter 258 may include at least two switches S1 and S2 arranged in series between a reference terminal and the positive terminal of the battery. The at least two switches S1 and S2 may have a common switch terminal electrically connected to the first converter terminal 252 of the switching converter 258.

The at least two switches S1 and S2 are implemented as Metal-Oxide-Semiconductor (MOS) switches which are controlled via control voltages Vctrl1 and Vctrl2 at the respective gates.

The control circuit 263 may include a measurement device 264 for measuring the phase difference between the voltage signals Vs1 and Vc1 across the first series inductor Ls1. The measurement device 264 may for example measure, for each voltage Vs1 and Vc1, two successive time points at which the respective voltage signal becomes zero (the so-called zero-crossing point) and determine the time difference between the two points. The first phase difference between the first time-periodical power grid voltage signal Vs1 and the first converter time-periodical voltage signal Vc1 may be determined by taking the difference between the measured two time differences.

Figure 4:
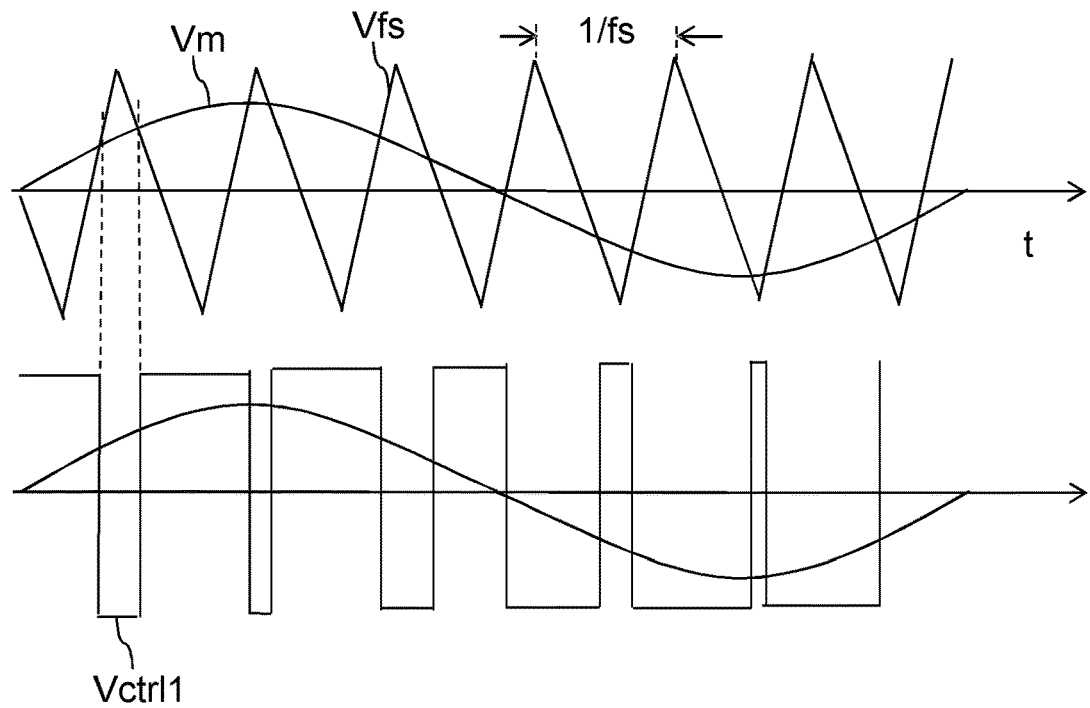

The measurement device 264 may include a processor (not shown in FIG. 3) to determine a time-periodical modulating signal Vm based on the measured first phase difference. A clock generator (not shown in FIG. 3) may generate a carrier signal Vfs at a predetermined switching frequency fs. FIG. 4 schematically shows the switching control voltages versus time for the circuit of FIG. 3. As shown in FIG. 4, the carrier signal Vfs may be a triangular periodical waveform having an oscillation frequency fs (i.e. time-periodical with period 1/fs) higher than the frequency of oscillation (i.e. the grid frequency, for example 50 or 60 Hz) of the modulating signal Vm. The carrier signal Vfs may have a predetermined carrier amplitude and the modulating signal Vm a modulating amplitude, both varying with time. The control circuit 264 may further include a comparator 265 for comparing the modulating amplitude with the carrier amplitude so as that the comparator 265 can output a first control voltage Vctrl1 for the lower switch S1. The second control voltage Vctrl2 for the upper switch S2 can be derived from the first control voltage Vctrl1 via for example an inverter. The lower and upper switches S1 and S2 are alternatively switched each time the modulating amplitude becomes higher or lower than the carrier amplitude. As shown in the example of FIG. 4, the voltage control Vctrl1 is triggered to a high level each time the modulating amplitude becomes higher than the carrier amplitude, switching on the lower switch S1 and switching off the upper switch S2, and triggered to a low level each time the modulating amplitude becomes lower than the carrier amplitude switching off the lower switch S1 and switching on the upper switch S2.

The zero-crossing point of the modulating signal Vm (as shown in FIG. 4) should be set by the processor with respect to the measured zero-crossing point of the first phase difference between Vs1 and Vc1. This relative zero-crossing time reference for Vm, together with the value of its modulating amplitude, controls the switching of the switching converter 258 such that the phase difference between the voltage signals Vs1 and Vc1 (i.e. the angle θ shown in the diagrams of FIG. 5 and FIG. 6) is in turns controlled. This allows the control of active and reactive power by the power converter 235.

The switching converter 258 may be arranged to operate with a pulse-width-modulated (PWM) switching scheme so that the control circuit 263 is configured to control the at least two switches with a time-periodical switching signal having a time-varying duty cycle, an example of which it is shown at the bottom of FIG. 4.

The switching converter 258 may operate with any modulation scheme suitable for the specific implementation. The modulation scheme may be a pulse density modulation (PDM), for example the Pulse Width Modulation (PWM) described above (wherein the frequency is substantially kept constant and a width of the pulse is modulated), or a Pulse Frequency Modulation (wherein the pulse width is substantially kept constant and the frequency is modulated).

It is noted that FIG. 3 shows an example of a single-phase half-bridge converter. However, the power converter can be arranged in any suitable configuration. For example, the power converter may be arranged as a full-bridge converter including another pair of at two series switches for rectifying, when in charging mode, also the negative cycle of the time-periodical voltage signals.

Figure 5:
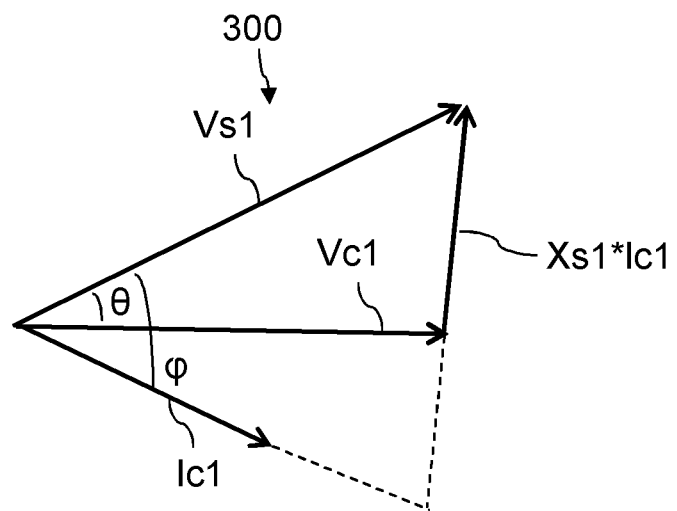

FIG. 5 shows a phasor diagram 300 for the currents and voltages indicated in the power converter 220 and 235. The phasor diagram 300 relates to the first phase time-periodical voltage signal Vs1. The phasor diagram 300 for the second and third phase time-periodical voltage signals Vs2 and Vs3 of the power converter 220 can be derived by applying the corresponding phase shift, e.g. 120 degree, to the phasors of the diagram 300.

Assuming that the first primary signal voltage Vp1 is a sinusoidal ac voltage signal with frequency $f_{grid}$, the impedance offered by the series inductor Ls1 is $$X_{S1} = 2\pi f_{grid} L_{S1} \tag{1}$$

A first phase shift θ between the secondary voltage signal Vs1 and the first converter voltage signal Vc1, can be freely adjusted by the appropriate switching pattern, an example of which is shown in FIG. 4.

The resulting phase shift between the first converter ac current signal Ic1 (or the corresponding secondary current signal Is1) and the first power grid voltage signal Vs1 is indicated with the angle φ.

In case of sinusoidal pulse-width modulation, it is known that the relation between the DC voltage of the converter Vo at the battery side and the first converter voltage Vc1 is:

$$V_{C1} = \frac{1}{\sqrt{2}} m_a \frac{V_o}{2}, \quad (2)$$

where $0 \leq m_a \leq 1$ is the amplitude modulation index, i.e. the ratio between the amplitudes of the modulating signal and the carrier signal as for example shown in FIG. 4. The frequency of the carrier signal determines the switching frequency fs of the switching converter.

The power delivered to the battery is:

$$P_o = V_o I_o \quad (3),$$

The power $P_o$ calculated for the three-phase power converter and in terms of the phasors shown in FIG. 5, becomes $$P_o = 3 \frac{V_{S1} V_{C1}}{X_{S1}} \sin\theta. \quad (4)$$

Substituting equation (2) into equation (4), $$P_o = 3 \frac{V_{S1} m_a}{2\sqrt{2} X_{S1}} \sin\theta \quad (5)$$

The power $P_0$ depends on the secondary ac power grid voltage $V_{S1}$, the amplitude modulation index $m_a$, the impedance $X_{S1}$ of the series inductor $L_{S1}$, and the the first phase difference $\theta$. The first phase difference $\theta$ may be the same phase-shift as the phase shift between the modulating signal with respect to the (measured) zero-crossings of the secondary power grid voltage signal $V_{S1}$.

The power converter may be arranged such that the first converter time-periodical current Ic1 has a predetermined phase shift $\varphi$ with the first time-periodical power grid voltage $V_{S1}$.

From the phasor diagram of FIG. 5 one can obtain the amplitude of the vector current $I_{C1}$ and the value of the predetermined phase shift $\varphi$ can be found as:

$$I_{C1} = \frac{1}{X_{S1}} \sqrt{(V_{S1} \sin\theta)^2 + (V_{S1} \cos\theta - V_{C1})^2}, \quad (6)$$

$$\varphi = \tan^{-1}\left(\frac{V_{S1} \cos\theta - V_{C1}}{V_{S1} \sin\theta}\right) \quad (7)$$

The power converter may be arranged to minimize power losses in the power conversion process. This is equivalent to minimize the converter input time-periodical voltage Ic1 and results in a reduction of the reactive power circulating through the switching converter.

Minimization of the power losses can be obtained by tuning the first time-periodical power grid voltage $V_{S1}$ and the amplitude modulation index $m_a$ to values for which the first converter input time-periodical current $I_{C1}$ is found to have a minimum for a nominal desired output power $P_o^{nom}$.

Figure 6:
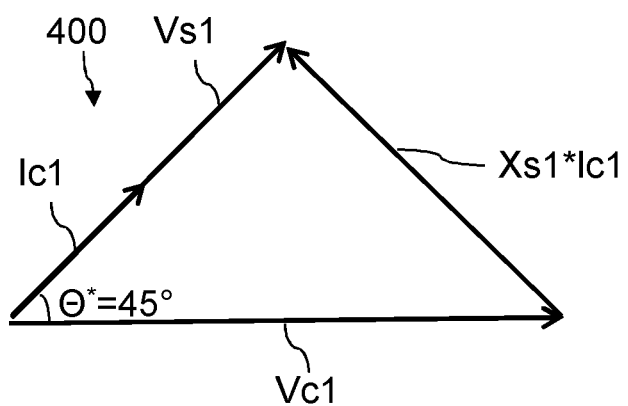

FIG. 6 shows an optimized phasor diagram 400 wherein the first converter input current $I_{C1}$ is minimized as described in the following paragraph starting from equation (6).

To determine a local minimum for equation (6), it is convenient to define the quantity to minimize as:

$$\alpha(m_a, V_{S1}) = (X_{S1} I_{C1})^2 \quad (8).$$

A minimization of equation (8) leads to a minimization of $I_{C1}$. From equation (4), sin θ can be derived in function of the output current $I_o$, the amplitude modulation index $m_a$, the reactance $X_{S1}$ and the time-periodical power grid voltage $V_{S1}$ by substituting equation (2) and (3) into equation (4):

$$\sin\theta = \frac{P_o}{3V_{C1}} \frac{X_{S1}}{V_{S1}} = \frac{2\sqrt{2}}{3} \frac{X_{S1} I_o}{m_a V_{S1}}. \quad (9)$$

Substitution of equations (2), (6) and (9) into equation (8) results in:

$$\alpha(m_a, V_{S1}) = \quad (10)$$

$$V_{S1}^2 - \frac{V_o^{nom}}{\sqrt{2}} \sqrt{V_{S1}^2 m_a^2 - \left(\frac{2\sqrt{2}}{3} X_{S1} I_o^{nom}\right)^2} + \left(\frac{V_o^{nom}}{2\sqrt{2}}\right)^2 m_a^2,$$

where $V_o^{nom}$ and $I_o^{nom}$ are the nominal voltage and nominal current delivered to the battery 255, respectively.

In first instance, it is assumed to keep the value of the amplitude modulation index $m_a$ constant in (10) such that (10) depends only on $V_{S1}$. By determining the first derivative of (10) in function of $V_{S1}$ and equaling the first derivative to zero, we obtain:

$$\frac{\partial \alpha(m_a, V_{S1})}{\partial V_{S1}} = \quad (11)$$

$$2V_{S1} - \frac{V_o^{nom}}{\sqrt{2}} \frac{V_{S1} m_a^2}{\sqrt{V_{S1}^2 m_a^2 - \left(\frac{2\sqrt{2}}{3} X_{S1} I_o^{nom}\right)^2}} = 0$$

The particular value $V_{S1}^*$ solution for equation (11) is found to be:

$$V_{S1}^*(m_a) = \sqrt{m_a^2 \left(\frac{V_o^{nom}}{4\sqrt{2}}\right)^2 + \frac{1}{m_a^2}\left(\frac{2\sqrt{2}}{3} X_{S1} I_o^{nom}\right)^2}. \quad (12)$$

By substituting (12) into (10), follows:

$$\alpha(m_a, V_{S1}^*(m_a)) = m_a^2 \left(\frac{V_o^{nom}}{4\sqrt{2}}\right)^2 + \frac{1}{m_a^2}\left(\frac{2\sqrt{2}}{3} X_{S1} I_o^{nom}\right)^2 \quad (13)$$

By calculating the first derivative of (13) and equaling the first derivative of (13) to zero, a global minimum of equation (8) can be found. The first derivative of (13) in function of the amplitude modulation index $m_a$ is $$\frac{\partial \alpha(m_a, V_{S1}^*(m_a))}{\partial m_a} = 2m_a \left(\frac{V_o^{nom}}{4\sqrt{2}}\right)^2 - \frac{2}{m_a^3}\left(\frac{2\sqrt{2}}{3} X_{S1} I_o^{nom}\right)^2 = 0 \quad (14)$$

The particular value $m_a^*$ which is a solution of (14) is found to be:

$$m_a^* = \sqrt{\frac{16}{3} \frac{X_F I_o^{nom}}{V_o^{nom}}} \quad (15)$$

By substituting (15) into equation (12), the global minimum for the nominal output power $P_{out}^{nom}$ is found:

$$V_S^*(m_a^*) = \sqrt{\frac{X_F I_o^{nom} V_o^{nom}}{3}} \quad (16)$$

By combining equations (9), (15) and (16) the particular phase difference $\theta^*$ for which the converter input current $I_{C1}$ is minimum can be found.

$$\sin \theta^* = \frac{\sqrt{2}}{2} \rightarrow \theta^* = \frac{\pi}{4} \quad (17)$$

The minimum converter input current $I_{C1}$ (or minimum secondary current $I_{S1}$) is in-phase with the first time-periodical power grid voltage Vs1, therefore also in phase with the distribution grid voltage.

FIG. 6 shows that the first converter input current $I_{C1}$ and the secondary power grid voltage $V_{S1}$ are in phase. FIG. 6 shows also that the secondary power grid voltage $V_{S1}$ and the converter input voltage $V_{C1}$ have a phase shift $\theta^*$ equal to 45 degrees when the converter input current is minimized. The minimum root mean square value of the converter input current $I_{S1}^*$ can be derived from (13) and (15) to be $$I_{S1}^*(m_a^*) = \sqrt{\frac{I_o^{nom} U_o^{nom}}{3 X_{S1}}} \quad (18)$$

The control circuit can thus be arranged to control the phase difference to a value close to 45 degrees.

Equation (16) can be used to determine the wire winding turns ratio of the power grid distribution transformer 230 in order to obtain the optimal secondary power grid voltage for the nominal power $P_{out}^{nom}$ delivered to the battery:

$$\frac{N_{S1}^*}{N_{P1}^*} = \frac{V_{S1}^*}{V_{P1}} = \frac{\sqrt{\frac{X_{S1} I_o^{nom} V_o^{nom}}{3}}}{V_{P1}}, \quad (19)$$

where $V_{P1}$ is the first primary power grid voltage at the primary side of the power grid distribution transformer 230.

The first reactance Xs1 of the first series inductor Ls1 is selected based on the selected winding turns ratio at a desired power.

In order to obtain the desired power transferred to the battery, the first reactance Xs1 may be selected such that the winding turns ratio is equivalent to the ratio of the root mean square of the transferred desired power $P_o$ multiplied by the selected first reactance Xs1 and divided by three, to the first primary time-periodical power grid voltage signal Vp1. This ratio provides a power transfer with minimal power losses.

Since the winding turns ratio of power grid transformer 230 can be selected by the power converter manufacturer with the procedure explained above according to equation (19), power transfer from the grid network to the battery can be optimized with only two conversion stages.

On the contrary, since the winding turns ratio of the standard grid transformer 135 of FIG. 1 is a standard one and cannot be selected by the manufacturer, in known battery charger 100, optimal power transfer from the grid network to the battery can be achieved only via a chain of many conversion stages 120, 130, 140 and 150.

Figure 7:
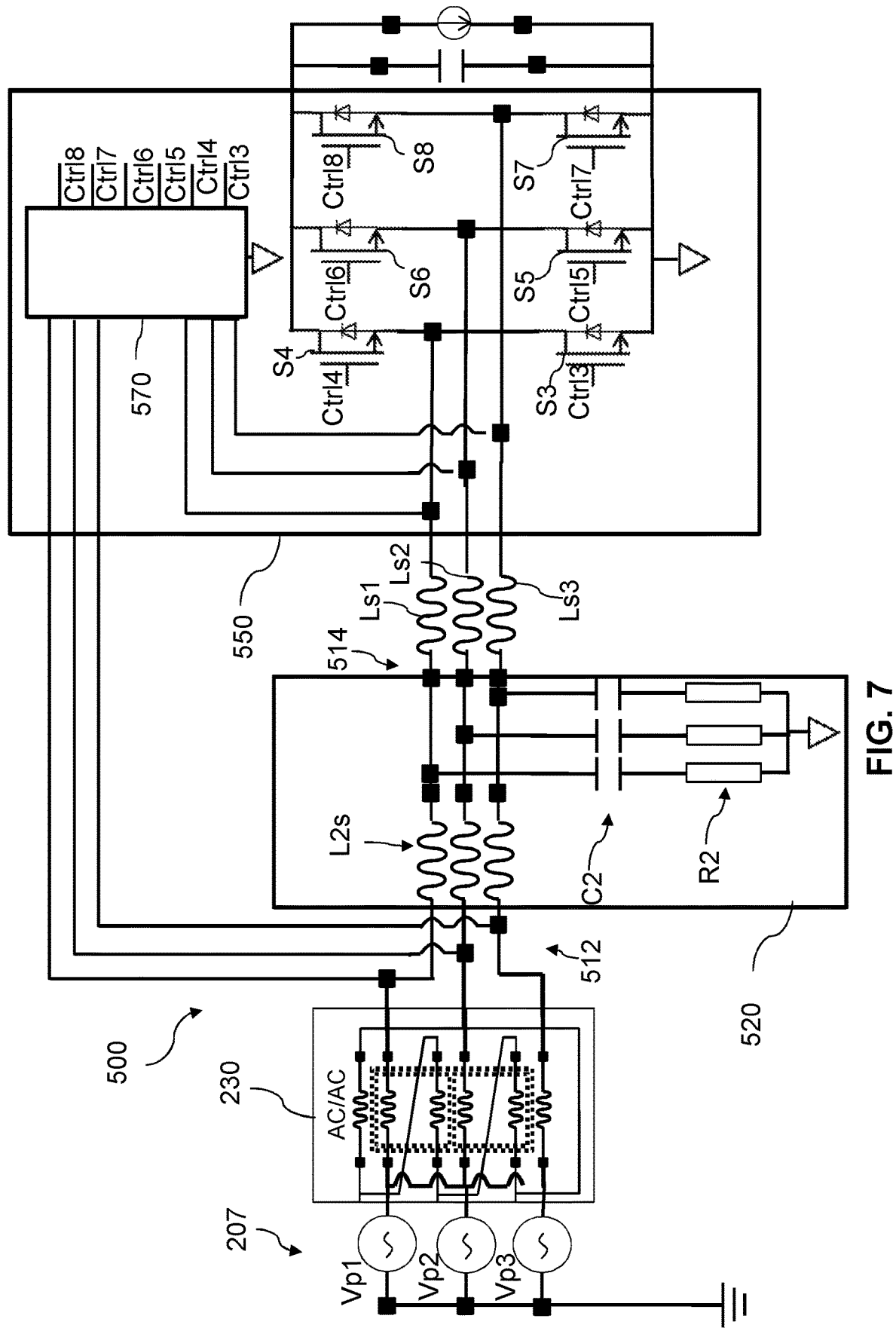

FIG. 7 schematically shows a circuit diagram of a second example of a three-phase power converter 500 according to some embodiments.

The power converter 500 differs from the power converter 220 in that it includes a switching converter 550 and filtering circuitry 520 arranged in series between the three terminals 512 of the power grid distribution transformer 230 and first terminals 514 of the series inductors Ls1, Ls2, and Ls3. The switching converter 550 is implemented with Metal-Oxide-Semiconductor Field Effect Transistors (MOS) switches S3-S8 controlled by control voltages Ctrl3-Ctrl8 as a three-phase full wave bridge or full converter topology. The switching converter 550 includes a control circuit 570. The switching converter 550 may operate with the same principles of operation described with reference to FIGS. 3 and 4 for the power converter 235, wherein the voltage controls for each series branch of switches are the same but phase-shifted of 120 degrees between each other.

Filtering circuitry 520 may include shunt capacitors C2 (or a single capacitor in single phase chargers). The shunt capacitors C2 have first capacitor terminals coupled between the output terminals 512 of the power grid distribution transformer 230 and inductor terminals 514, and second capacitor terminals for coupled to a reference potential.

The control circuit 570, three-phase switching converter 550 and filtering circuitry 520 are referenced, in use, to a second reference potential different from the first reference potential to which the power grid voltage source 207 is referenced.

The shunt capacitors C2 may be coupled to the second reference potential, for example a local ground different from the earth to which the power grid voltage source 207 is connected, via respective resistors R2. The resistors R2 may be used to damp any oscillation generated in the filtering circuit 520. Alternatively to the passive damping, active damping may be used. These techniques are known to the person of ordinary skill in the art and herein are not described.

Additionally to the capacitor C2 and the resistors R2, the filtering circuitry 520 may include second series inductors L2s arranged in series between the output terminals 512 of the power grid distribution transformer 230 and inductor terminals 514 of the first series inductors Ls1, Ls2 and Ls3.

Alternatively to the use of dedicated series filter inductors L2s, parasitic series inductors of the power grid transformer 230 may be used, thereby saving the cost of extra added components.

The filtering circuitry 520 may thus be implemented as an LC filter with first series inductors L2s and shunt capacitor C2 to reduce amplitude of harmonic components generated by switching of the switching converter 550. Reduction of the amplitude of the harmonic components may for example be specified by the grid operator.

The first series inductors Ls1, Ls2 and Ls3 may be designed as explained through equations (1) to (19) to optimize power transfer between the power grid distribution transformer and the switching converter. The first series inductors Ls may additionally be designed to suppress harmonic components generated in the switching converter.

However, by implementing a separate filter 520, requirements on the first series inductors Ls1, Ls2 and Ls3 may be relaxed from the filtering requirements, thereby the first series inductors Ls may be designed to be smaller and for optimal power transfer only.

Figure 8:
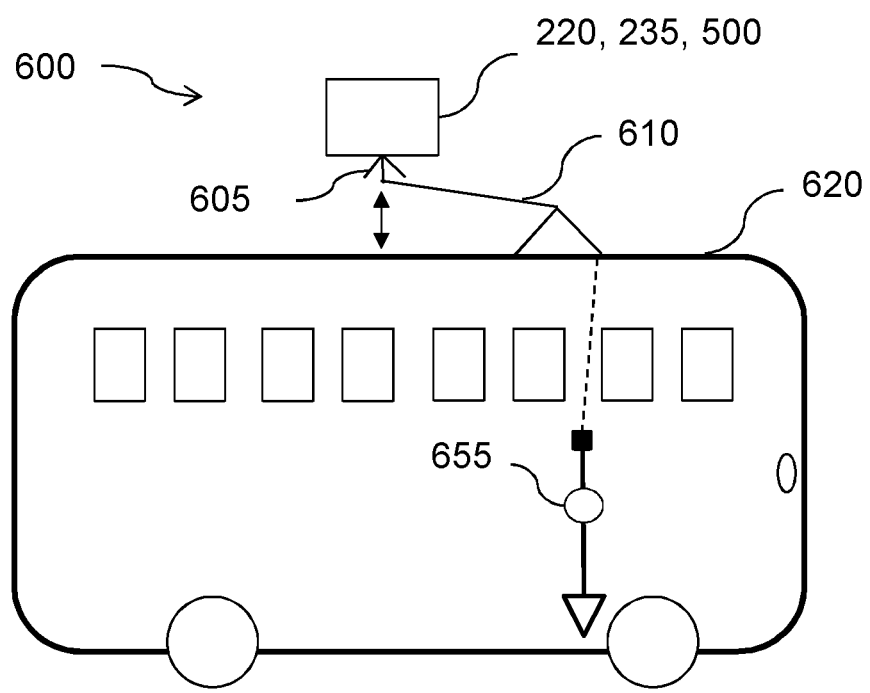

FIG. 8 schematically shows an example of a power converter system 600. The power converter system 600 includes any of the power converters 220, 235 or 500 shown with reference to the FIG. 2, FIG. 3, or FIG. 7, respectively. The power converter system 600 includes a charger connector 605. The charger connector 605 is electrically coupled to the further converter terminal of the switching converter (not shown in FIG. 8) and mechanically connectable to a vehicle connector 610 electrically coupled to terminals of a battery 655 of the vehicle 620 for electrically coupling the converter output to the battery 655 and charging the battery via the output power.

The vehicle 620 may be any type of plug-in electric or hybrid vehicle, for example a passenger vehicle, a commercial vehicle, a car, a bus, a truck, a van, or the like. The vehicle power converter system 600 may be installed in charging stations where the vehicle 620 temporarily stops for charging the battery 655.

The power converter 220, 235 or 500 may for example include all components shown in the FIG. 2, FIG. 3, or FIG. 7 including the power grid distribution transformer. Alternatively, the power grid distribution transformer may be located outside the power converter 220, 235 or 500.

In FIG. 8, the power converter 220, 235 or 500 is shown to be outside the vehicle 620, i.e. to be an off-vehicle power converter. Alternatively, only the power grid distribution transformer may an off-vehicle component while the switching converter, and/or the series inductors Ls and/or the filtering circuitry 520 described with reference to FIG. 7 may be located inside the vehicles.

The vehicle connector 610 may be mounted on a pantograph system on top of the vehicle 620 such that when the vehicle is driving the pantograph is tilted down on the top of the vehicle 620 and when the vehicle is charging the battery 655 the pantograph is tilted up to contact the charger connector 605.

However, other types of power converter system and vehicle connectors are possible. The vehicle connector may be of a socket type connector wherein the charger connector 605, for example a plug, may be inserted. The power converter system 600 may thus look more similar to a gas pump station having in the charger system an extension electrical cable connecting the plug to the power converter and suitable for connecting the socket connector in the vehicle.

The power converters 220, 235, 500 and the power converter system 600 have been described with respect to their battery charging function. It is to be noted however that any of power converters 220, 235 or 500 or power converter system 600 may be arranged to deliver power to the grid by inverting a direction of the current in the battery. The power converters 220, 235, 500 may be thus bidirectional, i.e. delivering power to the battery when the battery is not fully charged or delivering battery to the grid when the battery is fully charged or when the battery of the vehicle is sufficiently charged for the next riding. This can be done by controlling the magnitude and the phase of the first converter time-periodical voltage signal Vc1 with respect to the first time-periodical power grid voltage signal Vs1 (for each phase) such that the first converter time-periodical current signal Ic1 has inverted phase compared to the case when the power converter is in charging mode and thus power can flow from the battery to the grid network. In this case the power converter is operating as an inverter. For inverter operation, the battery voltage may be greater than the peak amplitude of the time-periodical power grid voltage Vs or at least be greater for some cycles during switching of the switching converter.

Bidirectional chargers may allow for discharging of the vehicle batteries into the grid for service purposes. Bidirectional chargers may also increase stability of the grid by providing power to the grid when possible.

It should be noted that the above-mentioned embodiments illustrate rather than limit the presently disclosed subject matter, and that those of ordinary skill in the art will be able to design many alternative embodiments.

For example, the switching converters 258 and 550 are implemented with Metal-Oxide-Semiconductor Field Effect Transistors (MOS) switches S3-S9.

However, other type of switching elements may be used, for example Metal-Semiconductor Field Effect Transistors (MESFET's), Junction-Field Effect Transistors (J-FET's), Bipolar transistors (BJT's), Insulated-gate bipolar transistor (IGBT's) or thyristors. Also different converter topologies suitable for the specific implementation may be used: for example, single phase or three-phase half-bridge converters, single phase full converters, single phase or three-phase boost or buck converters etc.

In the claims, any reference signs placed between parentheses shall not be construed as limiting the claim. Use of the verb "include" and its conjugations does not exclude the presence of elements or steps other than those stated in a claim. The article "a" or "an" preceding an element does not exclude the presence of a plurality of such elements. Some embodiments may be implemented by hardware including several distinct elements, and by a suitably programmed computer. In the device claim enumerating several devices, several of these devices may be embodied by one and the same item of hardware. The mere fact that certain measures are recited in mutually different dependent claims does not indicate that a combination of these measures cannot be used to advantage.

Examples of a power converter, a three-phase power converter and a power converter system are defined in the following numbered clauses:

1. A power converter (200) for converting power between a first time-periodical power grid voltage signal (Vs1) of a power grid network at a grid frequency and a battery (255), comprising
   a switching converter (250) including
     a first converter terminal (252) for transferring power between the power grid network and the switching converter (250),
     a further converter terminal (256) for coupling to a positive terminal of the battery,
   a first series inductor (Ls1) having a first inductor terminal for electrically coupling to a grid terminal, the grid terminal being coupled to the time-periodical power grid voltage signal (Vs1) for providing a first converter time-periodical current signal (Ic1), and another first inductor terminal for electrically coupling to the first converter terminal (252) for providing a first converter time-periodical voltage signal (Vc1), and
   a control circuit (260) configured for controlling a first phase difference between the first time periodical power grid voltage signal (Vs1) and the first converter time periodical voltage signal (Vc1) by switching the switching converter such that a first voltage phase of the time-periodical power grid voltage signal (Vs1) with respect to a first current phase of the first converter time-periodical current (Ic1) is controlled for reducing power losses when the power is converted, wherein the power converter is arranged to cooperate with a grid transformer (210) for providing the first time-periodical power grid voltage signal (Vs1) from a primary first time-periodical power grid voltage signal (Vp1), and the grid transformer is arranged to have a first selected secondary to primary winding turns ratio.

2. A power converter (200) according to clause 1, wherein the control circuit (260) is configured for controlling the first phase difference such that the first time-periodical power grid voltage signal (Vs1) and the first converter time-periodical current (Ic1) are in phase.

3. A power converter (200) according to any of the preceding clauses, wherein the control circuit is electrically coupled to the first inductor terminal and the other first inductor terminal, for measuring the first phase difference.

4. A power converter (200) according to any of the preceding clauses, wherein a first reactance of the first series inductor is selected based on the selected winding turns ratio of the grid transformer at a desired power.

5. A power converter according to clause 4, wherein the first reactance is selected such that the winding turns ratio is equivalent to the ratio of the root mean square of the transferred desired nominal power ($P_o$) multiplied by the selected reactance and divided by three, to the first primary time-periodical power grid voltage signal (Vp1).

6. A power converter according to any of the preceding clauses, wherein the control circuit is configured for controlling the first phase difference to a value close to 45 degrees.

7. A power converter (230) according to any of the preceding clauses, wherein the switching converter (252) includes at least two switches (S1; S2) arranged in series between a reference terminal and the positive terminal of the battery and having a common switch terminal electrically connected to the first terminal.

8. A power converter (230) according to clause 7, wherein the control circuit is configured for switching the switching converter based on a comparison between a time-periodical carrier signal at a predetermined switching frequency and a first time-periodical modulating signal at the grid frequency.

9. A power converter (230) according to clause 8, wherein the time-periodical modulating signal has a modulating amplitude and the time-periodical carrier signal has a carrier amplitude, and wherein the control circuit (263) is configured for comparing the modulating amplitude with the carrier amplitude and alternatively switching the at least two switches each time the modulating amplitude becomes higher or lower than the carrier amplitude.

10. A power converter according to any one of the preceding clauses, further including a shunt capacitor having a first capacitor terminal coupled to the first inductor terminal and a second capacitor terminal for coupling to a reference potential for attenuating harmonic components generated by switching of the switching converter.

11. A power converter according to clause 10, further including a second series inductor (L2s) arranged in series with first series inductor (Ls) between the grid terminal and the first inductor terminal (514).

12. A power converter according to clause 10 or 11, wherein the second capacitor terminal is coupled to the reference terminal via a resistor for damping parasitic oscillations.

13. A power converter according to any preceding clauses, wherein the power converter is a three-phase power converter, the switching converter is a three-phase switching converter, for converting power between the first time-periodical power grid voltage signal for a first phase, a second time-periodical power grid voltage signal for a second phase, a third time-periodical power grid voltage signal for a third phase, and a battery (255), and the grid transformer is a three-phase grid transformer for providing the first time-periodical power grid voltage signal (Vs1) from the primary first time-periodical power grid voltage signal (Vp1), the second time-periodical power grid voltage signal (Vs2) from a primary second time-periodical power grid voltage signal (Vp2) and the third time-periodical power grid voltage signal (Vs3) from a primary third time-periodical power grid voltage signal (Vp3), wherein the three-phase switching converter includes the first converter terminal for the first phase, a second converter terminal for the second phase and a third converter terminal for the third phase, wherein the three-phase power converter further includes a second series inductor (Ls2) having a second inductor terminal for coupling to the second grid terminal being coupled to the second time-periodical power grid voltage signal (Vs2) for providing a second converter time-periodical current signal (Ic2) and another second inductor terminal for coupling to the second converter terminal for providing a second converter time-periodical voltage signals (Vc2), a third series inductor (Ls3) having a third inductor terminal for coupling to the third grid terminal being coupled to the third time-periodical power grid voltage signal (Vs3) for providing a third converter time-periodical current signal (Ic3) and another third inductor terminal for coupling to the third converter terminal for providing a third converter time-periodical voltage signal (Vc3), wherein the control circuit (262) is configured for controlling a second phase difference between the second time-periodical power grid voltage signal (Vs2) and the second converter time-periodical voltage signal (Vc2) by switching the switching converter such that a second voltage phase of the second time-periodical power grid voltage signal (Vs2) with respect to a second current phase of the second converter time-periodical current signal (Ic2) is controlled for reducing power losses when a second phase power is converted, and a third phase difference between the third time-periodical power grid voltage signal (Vs3) and the third converter time-periodical voltage signal (Vc3) by switching the switching converter (251) such that a third voltage phase of the third time-periodical power grid voltage signal (Vs3) with respect to a third current phase of the third converter time-periodical current signal (Ic3) is controlled for reducing power losses when a third phase power is converted, and wherein the three-phase power converter is arranged to cooperate with the three-phase grid transformer (210), and the grid transformer is arranged to have a second selected secondary to primary winding turns ratio for the second phase and a third selected secondary to primary winding turns ration for the third phase.

14. A power converter system, including the power converter according to any of the clauses 1 to 12 and a single phase grid transformer or the three-phase power converter according to clause 13, and a three-phase grid transformer for providing the second time-periodical power grid voltage signal (Vs1), the second time-periodical power grid voltage signal (Vs2) and the third time-periodical power grid voltage signal (Vs3), respectively.

15. A power converter system according to clause 14, including a charger connector electrically coupled to the further converter terminal of the switching converter and mechanically connectable to a vehicle connector, the vehicle connector for coupling to the positive terminal of the battery of the vehicle such that when the charger connector is connected to the vehicle connector, the further converter terminal is coupled to the battery for charging the battery from the grid network or transferring power from the battery to the grid network.

The invention claimed is:

1. A three-phase power converter for converting power between a power grid network and a battery, the three-phase power converter comprising:
    a three-phase switching converter, including:
        a first converter terminal for the first phase, a second converter terminal for the second phase and a third converter terminal for the third phase for transferring power between the power grid network and the three-phase switching converter, and a further converter terminal for coupling to a positive terminal of the battery,
    a first series inductor having a first inductor terminal for electrically coupling to a first grid terminal, the first grid terminal being coupled to a first time-periodical power grid voltage signal for providing a first converter time-periodical current signal and another first inductor terminal for electrically coupling to the first converter terminal for providing a first converter time-periodical voltage signal,
    a second series inductor having a second inductor terminal for electrically coupling to a second grid terminal being electrically coupled to a second time-periodical power grid voltage in signal for providing a second converter time-periodical current signal and another second inductor terminal for electrically coupling to the second converter terminal for providing a second converter time-periodical voltage signals,
    a third series inductor having a third inductor terminal for electrically coupling to a third grid terminal being electrically coupled to a third time-periodical power grid voltage signal for providing a third converter time-periodical current signal and another third inductor terminal for electrically coupling to the third converter terminal for providing a third converter time-periodical voltage signal, and
    a control circuit configured for controlling
        a first phase difference between the first time periodical power grid voltage signal and the first converter time periodical voltage signal by switching the three-phase switching converter such that the first time-periodical power grid voltage signal and the first converter time-periodical current are in phase,
        a second phase difference between the second time-periodical power grid voltage signal and the second converter time-periodical voltage signal by switching the three-phase switching converter such that the second time-periodical power grid voltage signal and the second converter time-periodical current signal are in phase, and
        a third phase difference between the third time-periodical power grid voltage signal and the third converter time-periodical voltage signal by switching the three-phase switching converter such that the third time-periodical power grid voltage signal and the third converter time-periodical current signal are in phase, and
    a three-phase grid transformer for providing electrical isolation between the battery and the grid network, the three-phase grid transformer having a primary and a secondary for providing the first time-periodical power grid voltage signal from a primary first time-periodical power grid voltage signal, the second time-periodical power grid voltage signal from a primary second time-periodical power grid voltage signal, the third time-periodical power grid voltage signal from a primary third time-periodical power grid voltage signal, wherein:
    the primary first time-periodical power grid voltage signal, the primary second time-periodical power grid voltage signal and the primary third time-periodical power grid voltage signal are referenced, in use, to a first reference potential, and
    the three-phase switching converter, the control circuit, the battery and the secondary of the three-phase grid transformer are referenced, in use, to a second reference potential different from the first reference potential, and
    wherein a reactance of each series inductor is selected based on a winding turns ratio of the secondary to the primary of the three-phase grid transformer such that the first time periodical power grid voltage and the first converter time-periodical current, the second time periodical power grid voltage and the second converter time-periodical current, and the third time-periodical power grid voltage signal and the third converter time-periodical current are in phase at a desired converted power, and
    wherein the reactance of a series inductor is selected such that the winding turns ratio is equivalent to a ratio of a root mean square of a transferred desired nominal power multiplied by the selected reactance and divided by three, to the first, second or third primary time-periodical power grid voltage signal.

2. The power converter according to claim 1, wherein the control circuit is electrically coupled to the first, second and third inductor terminals and the another first, second and third inductor terminals, for measuring the first, second and third phase differences.

3. The power converter according to claim 2, wherein the reactance of each series inductor is selected based on a winding turns ratio of the secondary to the primary of the three-phase grid transformer such that the first time-periodical power grid voltage signal and the first converter time-periodical current, the second time-periodical power grid voltage signal and the second converter time-periodical current signal, and the third time-periodical power grid voltage signal and the third converter time-periodical current signal are in phase at a desired converted power.

4. The power converter according to claim 2, wherein the control circuit is configured for controlling the first phase difference, the second phase difference and the third phase difference to a value close to 45 degrees.

5. The power converter according to claim 2, wherein the three-phase switching converter includes, for each phase, at least two switches arranged in series between a reference terminal and the positive terminal of the battery and having a common switch terminal electrically connected to the first converter terminal, second converter terminal and third converter terminal, respectively.

6. The power converter according to claim 1, wherein the control circuit is configured for controlling the first phase difference, the second phase difference and the third phase difference to a value close to 45 degrees.

7. The power converter according to claim 1, wherein the three-phase switching converter includes, for each phase, at least two switches arranged in series between a reference terminal and the positive terminal of the battery and having a common switch terminal electrically connected to the first converter terminal, second converter terminal and third converter terminal, respectively.

8. The power converter according to claim 7, wherein the control circuit is configured for switching the three-phase switching converter based on a comparison between a time-periodical carrier signal at a predetermined switching frequency and a time-periodical modulating signal at a grid frequency for each phase.

9. The power converter according to claim 8, wherein the time-periodical modulating signal has a modulating amplitude and the time-periodical carrier signal has a carrier amplitude, and wherein the control circuit is configured for comparing the modulating amplitude with the carrier amplitude and alternatively switching the at least two switches each time the modulating amplitude becomes higher or lower than the carrier amplitude.

10. The power converter according to claim 1, further comprising a shunt capacitor for each phase having a capacitor terminal coupled to the corresponding inductor terminal and a further capacitor terminal for coupling to the second reference potential for attenuating harmonic components generated by switching of the three-phase switching converter.

11. The power converter according to claim 10, further comprising a further series inductor for each phase arranged in series with the corresponding series inductor between the grid terminals and the corresponding inductor terminals.

12. The power converter according to claim 10, wherein each further capacitor terminal is electrically coupled to the second reference potential via a corresponding resistor for damping parasitic oscillations.

13. A power converter system, comprising:
the power converter according to claim 1, and
a charger connector electrically coupled to the further converter terminal of the three-phase switching converter and mechanically connectable to a vehicle connector, the vehicle connector for coupling to the positive terminal of the battery of the vehicle such that when the charger connector is electrically connected to the vehicle connector, the further converter terminal is coupled to the battery for charging the battery from the grid network or transferring power from the battery to the grid network.

14. The power converter according to claim 1, wherein the control circuit includes a measurement device for measuring the first, second and third phase differences.

15. The power converter according to claim 14, wherein the measurement device is configured to measure two successive time points at which the first, second and third time-periodical power grid voltage signals and the first, second and third converter time-periodical voltage signals have zero amplitude and to determine a time difference between the two successive time points of each voltage signal for determining the first, second and third phase differences.

16. The power converter according to claim 14, wherein the measurement device (264) comprises a processor configured to determine a first, second and third time-periodical modulating signals based on the measured first, second and third phase differences, respectively.

17. The power converter according to claim 1, wherein the control circuit is configured for controlling the first phase difference, the second phase difference and the third phase difference to a value close to 45 degrees.

18. The power converter according to claim 1, wherein the control circuit is configured for controlling the first phase difference, the second phase difference and the third phase difference to a value close to 45 degrees.

* * * * *